Sept. 4, 1928.
C. C. PISCIOTTA
WINDSHIELD WIPER
Filed Feb. 15, 1927
1,683,053
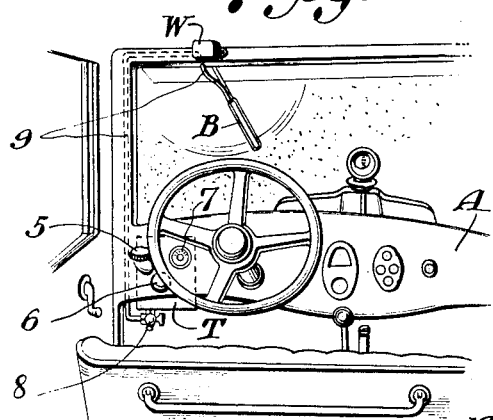
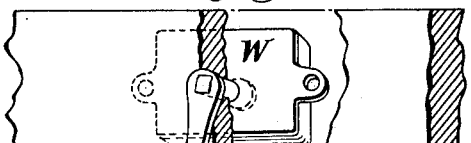
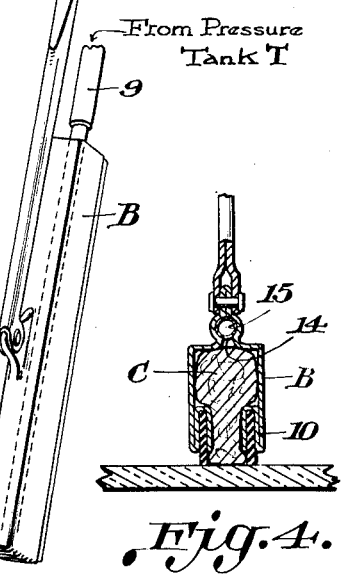
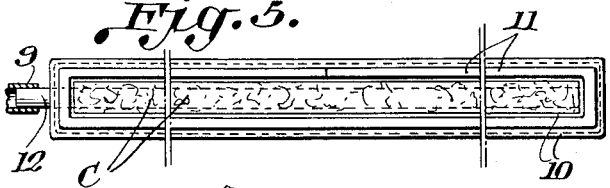
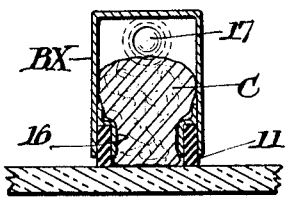
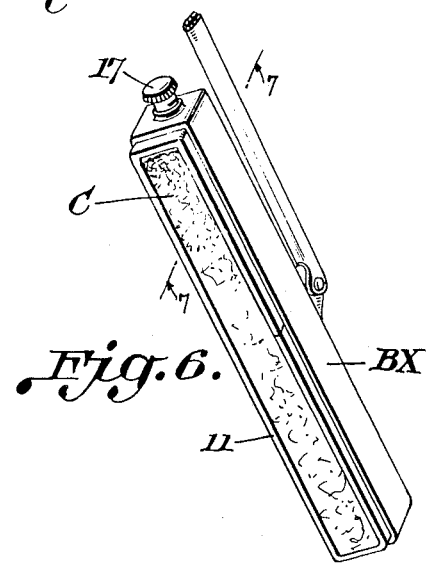
Inventor
Carl C. Pisciotta
By John C. Firmin
his Attorney Patented Sept. 4, 1928.

1,683,053

UNITED STATES PATENT OFFICE.

CARL C. PISCIOTTA, OF HIGHLAND PARK, NEW JERSEY.

WINDSHIELD WIPER.

Application filed February 15, 1927. Serial No. 168,462.

This invention relates to an improved apparatus for clearing glass of rain and preventing the accumulation of ice thereon.

It is particularly adapted for use with automobiles in keeping the windshield clear in rain or freezing weather, but is equally adapted for use upon the windows of trolley cars, engine cab windows, pilot house windows, or the like. An object therefore of the present invention is to provide, in windshield wipers or the like, a structure which will positively and efficiently brush particles of moisture, ice or snow from the glass.

A further object is to associate with such structure means whereby a suitable antifreeze solution may be spread upon the surface of the glass by transfer of the solution from a container by contact.

A further object is to provide means associated with the wiping edges to supply an anti-freeze solution, or the like under pressure from a suitable source whereby a more positive and abundant supply of solution may be distributed at will, or the supply be entirely cut off.

A still further object is to provide means whereby parts of the device may be readily replaced if necessary and the wiping edges, as well as the retaining means for the solution, be removed for substitution of more suitable material as occasion may demand.

With these and other objects in view as may become apparent as the disclosure proceeds, the invention consists in the novel combination of elements, construction and arrangement of parts, operation and specific features to be hereinafter enlarged upon and recited in the subjoined claims, the invention being illustrated in the accompanying drawings, wherein, Figure 1 is a perspective view of the instrument board and windshield of an automobile showing the preferred position and arrangement of my windshield wiper with its improved blade and means to supply an anti-freeze solution thereto under pressure;

Figure 2 is a perspective view of one form of wind-shield wiper with one form of my improved blade;

Figure 3 is a side elevation, parts being broken away, to show the structure of a preferred form of windshield wipe blade;

Fig. 4 is a section on the line 4—4 of Fig. 3;

Figure 5 is a bottom plan of this form of blade;

Fig. 6 is a perspective view of a modified form of blade; and

Fig. 7 is an enlarged section thereof showing a modified structure of certain parts taken on line 7—7 of Figure 6.

Referring particularly to the drawings I have shown mounted upon the instrument board A of an automobile, and at the left thereof, a suitable pressure tank T provided with a filling cap 5, a hand pump 6 and pressure gauge 7. A suitable pet cock 8 is provided between the tank and a pressure pipe line 9 which leads to the wiper blade B of a windshield wiper operating means W.

In the structure shown this wiper blade comprises a suitable container of metal of approximately boxlike form, one side being open and adapted to face the glass over which the wiper blade is passed by its connection with the arm of the wiper.

The edges of the open side of the box may be crimped as at 10 to provide a channel for the reception of a strip of rubber, felt, leather, or the like, which forms a wiping edge or blade 11. This strip, as indicated in Figures 3 and 5, when inserted within the crimped holding edge, forms an enclosure, the strip being continuous throughout the perimeter of the edge, thus providing double blades for the wiping blade. The strips may be inserted only within the edges along two sides to leave one side or more open.

A wick C which may consist of a sponge, rubber sponge, or the like, is inserted within the cavity of the box, one surface of the sponge or wick lying in a plane adjacent the edges of the double blades or single blade, as the case may be, and in contact with the glass over which it is caused to move.

A conveyor or pipe 12 perforated at 14 is inserted within the cavity of the wiper and may be secured therein in any suitable manner, a crimp 15 being formed in the box for this purpose as shown in Figure 4 of the drawings.

The tube conveyor extends beyond one end of the box and to this is fastened one end of the pipe 9 from the pressure tank.

In the forms shown in Figures 6 and 7 the wiper blade BX is of similar boxlike structure, the felt or rubber edge-blades 11' being retained within an annular bead formed between the edges and the strip 16.

In this form a plug 17, inserted in one end of the box-blade, allows filling with any suitable anti-freeze preparation.

It has been found that a salt solution gives most excellent results with this wiper and where mentioned as an anti-freeze solution a solution of ordinary salt and water is meant, although it is to be understood that the use is not restricted to any particular preparation but that any suitable anti-freeze preparation may be used.

Where the solution is poured into the sponge-containing box of the wiper, the solution is passed from the sponge to the surface of the glass by contact, and as the wiper box contains but a small portion of the preparation the supply may be soon exhausted. A suitable pressure tank may be positioned as shown to supply the anti-freeze to the container and sponge.

It has been found that the action of an anti-freeze preparation alone, or the wiping of the glass alone by the ordinary wiper is under certain conditions not sufficiently positive in its action to prevent accumulation of frozen particles upon a windshield, but that a solution of anti-freeze applied to the windshield as disclosed and then wiped across the surface of the glass by the blades of the wiper loosens any accumulation thereupon and positively brushes the glass to the ideal condition for clear vision.

While in the foregoing I have described specific embodiments and have mentioned only certain modifications it will be appreciated that in practice I do not limit myself to such specific details as herein set forth, but may resort to any practical modifications falling within the scope of the claims.

What I claim is:

1. A wiper arm for windshield cleaners, comprising a hollow backing, an absorbent wiper strip having one edge embraced by the hollow backing, a distributor pipe within said backing, and a flexible conduit for conducting fluid to said distributor pipe.

2. As an article of manufacture, a wiper for use with an automatic windshield cleaning device, the wiper comprising a hollow back and a felt strip extending into the hollow back and embraced thereby, a perforated pipe entering the back and discharging against the back edge of the strip, a supply tank, and a pipe connection from the supply tank to the perforated pipe including a flexible portion and a valve.

3. As an article of manufacture, a wiper for use with an automatic windshield cleaning device, the wiper comprising a hollow back and a felt strip extending into the hollow back and embraced thereby, a perforated pipe entering the back and discharging against the back edge of the strip, a supply tank, means for maintaining pressure in the tank to cause the contents thereof to be supplied continuously under pressure to the wiper, and a pipe connection from the supply tank to the perforated tank including a flexible portion and a valve.

In testimony whereof I affix my signature.

CARL C. PISCIOTTA.